United States Patent
Gemba et al.

(10) Patent No.: US 7,143,096 B2
(45) Date of Patent: Nov. 28, 2006

(54) INFORMATION PROCESSING METHOD AND SYSTEM

(75) Inventors: Ryu Gemba, Yokohama (JP); Shinya Takeuchi, Yokohama (JP); Shotaro Ohno, Yamato (JP); Kenichi Shimooka, Yokohama (JP); Tomohiro Sonomura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 432 days.

(21) Appl. No.: 10/371,898

(22) Filed: Feb. 20, 2003

(65) Prior Publication Data

US 2003/0233382 A1 Dec. 18, 2003

(30) Foreign Application Priority Data

Jun. 14, 2002 (JP) ............... 2002-174945

(51) Int. Cl.
*G06F 17/30* (2006.01)
(52) U.S. Cl. ............... 707/10; 707/2; 707/104.1
(58) Field of Classification Search ............... 707/1, 707/2, 3, 4, 5, 6, 7, 8, 9, 10, 100, 104.1, 201, 707/202, 203; 710/5, 15
See application file for complete search history.

(56) References Cited

U.S. PATENT DOCUMENTS

| 6,269,382 | B1 * | 7/2001 | Cabrera et al. ............. 707/204 |
| 6,330,621 | B1 * | 12/2001 | Bakke et al. .................. 710/5 |
| 6,678,752 | B1 * | 1/2004 | Ashton et al. ................. 710/15 |
| 6,779,078 | B1 | 8/2004 | Murotani et al. |
| 2004/0024964 | A1 | 2/2004 | Taninaka et al. |
| 2004/0073677 | A1 | 4/2004 | Honma et al. |
| 2004/0177228 | A1 | 9/2004 | Leonhardt et al. |
| 2004/0193760 | A1 | 9/2004 | Matsunami et al. |

FOREIGN PATENT DOCUMENTS

| JP | 02-122361 A | 5/1990 |
| JP | 03-294938 A | 12/1991 |
| JP | 09-081439 A | 3/1997 |
| JP | 2001-350707 | 12/2001 |

OTHER PUBLICATIONS

Japan Patent Office (JPO), copy of an office action dated Jul. 11, 2006 for JPO patent application JP2002-174945.

* cited by examiner

*Primary Examiner*—Jeffrey Gaffin
*Assistant Examiner*—Yicun Wu
(74) *Attorney, Agent, or Firm*—Townsend and Townsend and Crew LLP

(57) ABSTRACT

A plurality of storage devices connected to at least one host computer via a network is to be managed. Access information about accesses from the host computer to each of the storage devices is referred to; a storage area in the storage device that has low access efficiency is determined based on the access information; a host computer having low access efficiency in view of the storage area having low access efficiency is determined based on the access information; a storage area having high access efficiency at least from the host computer having low access efficiency is determined; and data that is stored in the storage area having low access efficiency and used by the host computer having low access efficiency is transferred to the storage area having high access efficiency.

21 Claims, 9 Drawing Sheets

| STORAGE PRODUCT NUMBER | LDEV NO. | LU NO. | dev | vdev |
|---|---|---|---|---|
| 15001 (STORAGE 1) | 1 | 8 | dev1 | vdev1 |
| 15001 (STORAGE 1) | 1 | 10 | dev2 | vdev2 |
| 15008 (STORAGE 2) | 3 | 5 | dev3 | vdev3 |

301

| STORAGE PRODUCT NUMBER | LDEV NO. | LU NO. | STORAGE PORT ADDRESS | HOST PORT ADDRESS | ACCESS FREQUENCY (TIMES/WEEK) |
|---|---|---|---|---|---|
| 15001 (STORAGE 1) | 1 | 8 | 44.44.44.44.11.11.11.11 (PORT 1) | 11.11.11.11.11.11.11.11 (PORT X) | 1000 |
| 15001 (STORAGE 1) | 1 | 10 | 44.44.44.44.22.22.22.22 (PORT 2) | 11.11.11.11.11.11.11.11 (PORT X) | 500 |
| 15001 (STORAGE 1) | 1 | 10 | 44.44.44.44.22.22.22.22 (PORT 2) | 11.11.11.11.22.22.22.22 (PORT Y) | 3000 |

FIG. 5

| STORAGE PRODUCT NUMBER | LDEV NO. | LU NO. | STORAGE PORT ADDRESS | HOST PORT ADDRESS | ACCESS FREQUENCY (TIMES/WEEK) |
|---|---|---|---|---|---|
| 15001 (STORAGE 1) | 1 | 8 | 44.44.44.44.11.11.11.11 (PORT 1) | 11.11.11.11.11.11.11.11 (PORT X) | 1000 |
| 15001 (STORAGE 1) | 1 | 10 | 44.44.44.44.22.22.22.22 (PORT 2) | 11.11.11.11.11.11.11.11 (PORT X) | 500 |
| 15001 (STORAGE 1) | 1 | 10 | 44.44.44.44.22.22.22.22 (PORT 2) | 11.11.11.11.22.22.22.22 (PORT Y) | 3000 |
| 15008 (STORAGE 2) | 3 | 5 | 44.44.44.44.33.33.33.33 (PORT 3) | 11.11.11.11.11.11.11.11 (PORT X) | 10 |
| 15008 (STORAGE 2) | 3 | 5 | 44.44.44.44.33.33.33.33 (PORT 3) | 11.11.11.11.22.22.22.22 (PORT Y) | 90 |

| LU NO. | STORAGE PORT ADDRESS | HOST PORT ADDRESS | READ TIME (Sec.) | WRITE TIME (Sec.) |
|---|---|---|---|---|
| 8 | 44.44.44.44.11.11.11.11 (PORT 1) | 11.11.11.11.11.11.11.11 (PORT X) | 6 | 11 |
| 10 | 44.44.44.44.22.22.22.22 (PORT 2) | 11.11.11.11.11.11.11.11 (PORT X) | 4 | 8 |
| 10 | 44.44.44.44.22.22.22.22 (PORT 2) | 11.11.11.11.22.22.22.22 (PORT Y) | 5 | 9 |
| 5 | 44.44.44.44.33.33.33.33 (PORT 3) | 11.11.11.11.11.11.11.11 (PORT X) | 4 | 8 |
| 5 | 44.44.44.44.33.33.33.33 (PORT 3) | 11.11.11.11.22.22.22.22 (PORT Y) | 2 | 4 |

FIG. 7

INFORMATION PROCESSING METHOD AND SYSTEM

CROSS-REFERENCE TO RELATED APPLICATIONS

The present application claims priority upon Japanese Patent Application No. 2002-174945 filed Jun. 14, 2002, which is herein incorporated by reference.

BACKGROUND OF THE INVENTION

The present invention relates to an information processing method, an information processing device, a storage device, and a storage medium having a program recorded thereon.

Some host computers use a plurality of storages, for example, disk-array devices, and RAID (Redundant Array of Inexpensive Disks) devices, which comprise a plurality of disks, as storage devices in running application programs. More specifically, a host computer is connected to storages via a network such as a SAN (Storage Area Network), and the host computer stores data in logical volumes, which are logically created in the plurality of disk devices, distributing the data among the disk devices.

In such a data-distributed system, if the system specifies the storage for storing data from a certain host computer based merely on the logical classification of the data, there is a possibility that frequently-accessed data is stored in a storage that takes a long time to access. Therefore, to construct an efficient system, there is a need to select a storage area (storage device area) for each data based on information such as actual access time and access frequency.

Japanese Patent Application Laid-open Publication No. 2001-350707 discloses a technique for assigning data to storages (storage devices) and storage areas (logical volumes) based on collected evaluation values. According to this technique, storage devices and storage areas are assigned to respective applications (programs) according not only to access speed and other evaluation values collected by hosts (computers), but also according to users' priority (or policy), such as access frequency, backup frequency, and reliability.

This technique makes it possible to construct a system having high efficiency since storages and storage areas can be assigned according to the users' assignment policy.

In the technique mentioned above, the host determines which storage or logical unit (logical volume) to be accessed when running an application program, based on the evaluation data collected by the host itself.

However, the assignable storages and storage areas are limited to those devices that the host can use and evaluate. Therefore, the system efficiency is still not sufficient since storages and storage areas that the host is not using cannot be assigned.

SUMMARY OF THE INVENTION

It will be possible to construct a system having higher efficiency if a management server (information processing device) that manages the configuration of the whole system comprising a plurality of hosts and storages connected to a network can assign storage areas having higher access efficiency, such as storage areas that are closer to the host or that can be accessed more quickly from the host.

The present invention has been made in view of such a background and provides an information processing method, an information processing device, a storage device, and a storage medium having a program recorded thereon.

An aspect of the present invention enables management of a plurality of storage devices connected to at least one host computer via a network, and performs the processes of: referring to access information about accesses from the host computer to each of the storage devices; determining a storage area in the storage device that has low access efficiency based on the access information; determining a host computer having low access efficiency in view of the storage area having low access efficiency based on the access information; determining a storage area having high access efficiency at least from the host computer having low access efficiency; and transferring data that is stored in the storage area having low access efficiency and used by the host computer having low access efficiency to the storage area having high access efficiency.

The foregoing and other features and advantages of the present invention will be apparent from the following description of the embodiments of the invention and from the accompanying drawings.

BRIEF DESCRIPTION OF THE DRAWINGS

FIG. 5 shows an example of statistical information recorded by a storage according to an embodiment of the present invention;

FIG. 6 shows an example of statistical information recorded by the management server according to an embodiment of the present invention;

FIG. 7 shows an example of results of a benchmark test in an embodiment of the present invention;

DETAILED DESCRIPTION OF THE PREFERRED EMBODIMENTS

<Example of System Configuration>

Figure 1:
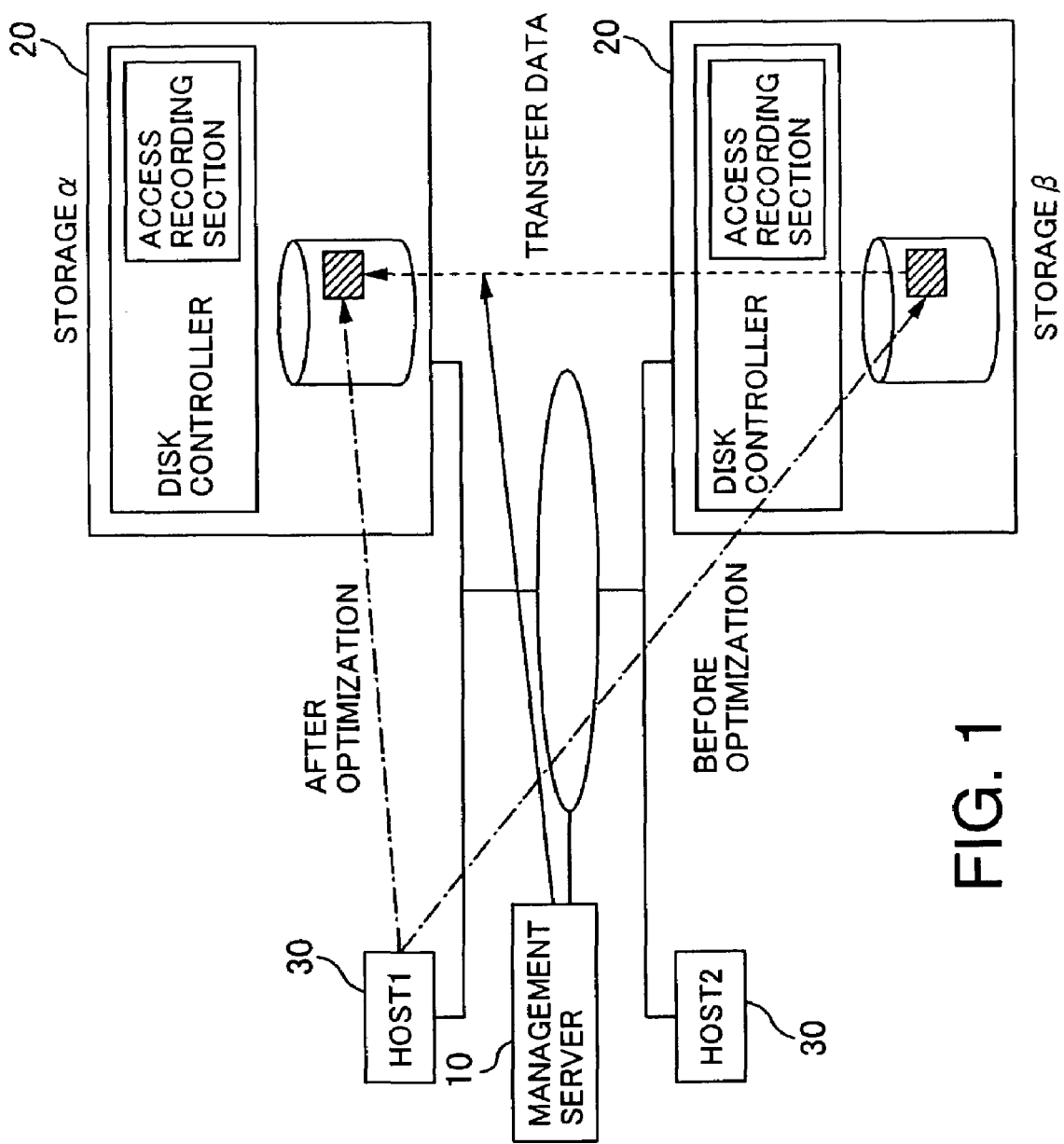
FIG. 1 shows a concept of the present invention.

FIG. 1 shows a broad outline of the present invention. A management server (information processing device) 10 reads out access information recorded in each of the storages 20 (e.g., storage devices, disk array devices and RAID devices) to collect access information about accesses from the hosts 30 to data stored in the storages 20. Then, in order to optimize access efficiency, the management server 10 determines an "optimum location" for storing data (e.g., storage α), and transfers (or performs "migration" of) data from an original location (e.g., storage β) to the optimum area (e.g., storage α).

Figure 2:
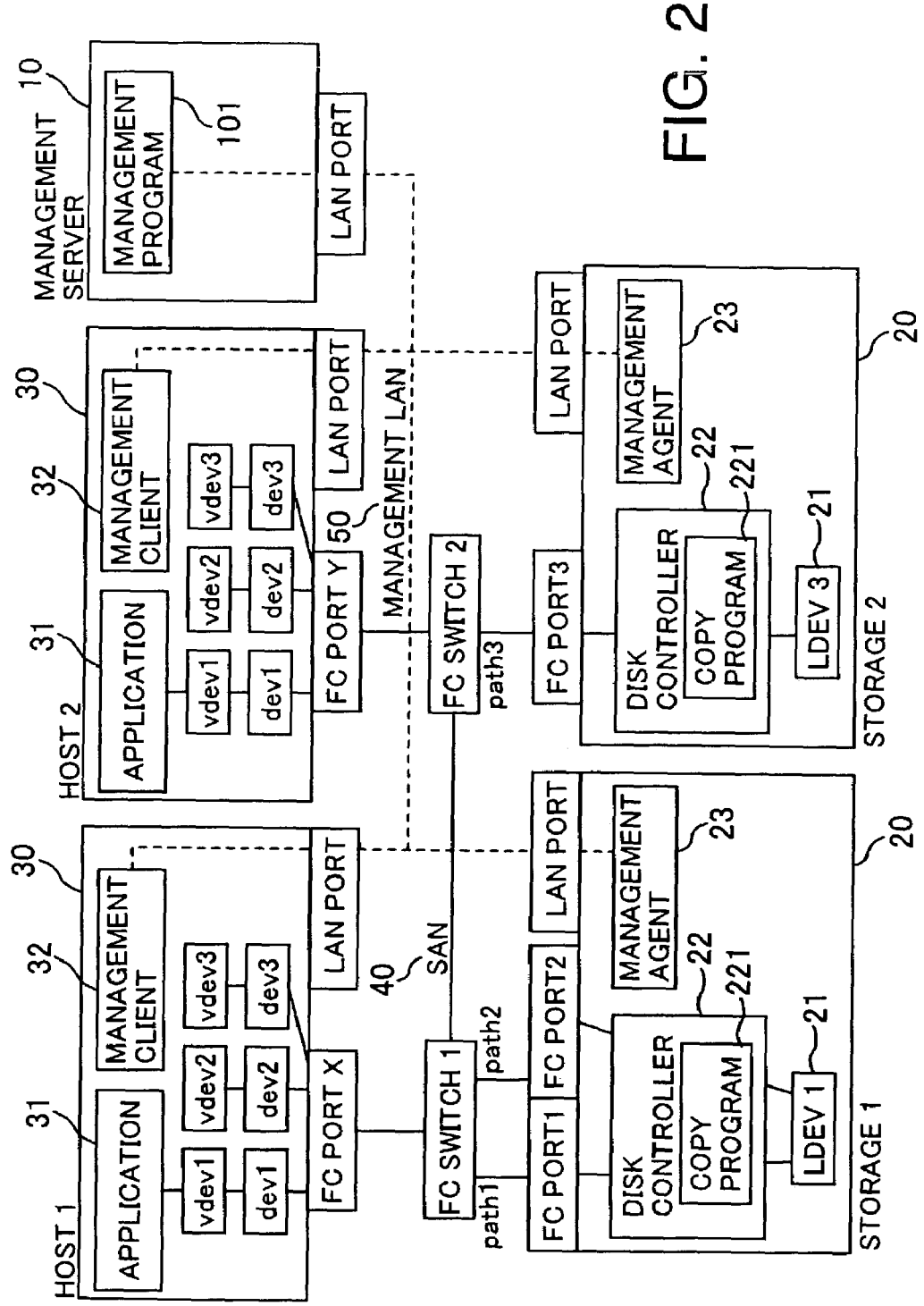
FIG. 2 is a block diagram showing an example of a system configuration according to an embodiment of the present invention.

FIG. 2 shows an example of an overall configuration of an embodiment of the present invention. A plurality of hosts 30 are connected to a plurality of storages 20 via a SAN (Storage Area Network) 40 using FC (Fibre Channel, Fabric) switches. An application program 31 is installed to each of the hosts 30 by a user. Each of the hosts 30 shares the plurality of storages 20 as external storage devices to store data necessary for executing the application programs 31. The application programs 31 may also be installed to the storages 20; it is to be noted that the technical scope of the present invention is not limited according to where the application program 31 is installed. Further, although a SAN 40 is adopted as the network for connecting the hosts 30 and the storages 20 in the present embodiment, a LAN, a private line, or any other type of network can be used. For example, an iSCSI network using IP routers or the like may be used. In the present embodiment, the management server (information processing device) 10 is connected to the plurality of hosts 30 and storages 20 via a management network 50, such as a LAN or the Internet, that is independent of the SAN 40. The management server 10 may instead be directly connected to the SAN 40.

Each host 30 has a management client program 32, as well as the application program 31, installed thereto. The management client 32 is started when, for example, a system administrator requests optimization of data by operating the management server 10. For example, the system administrator may enter a data optimization request to the management server 10.

Figures 3, 4:
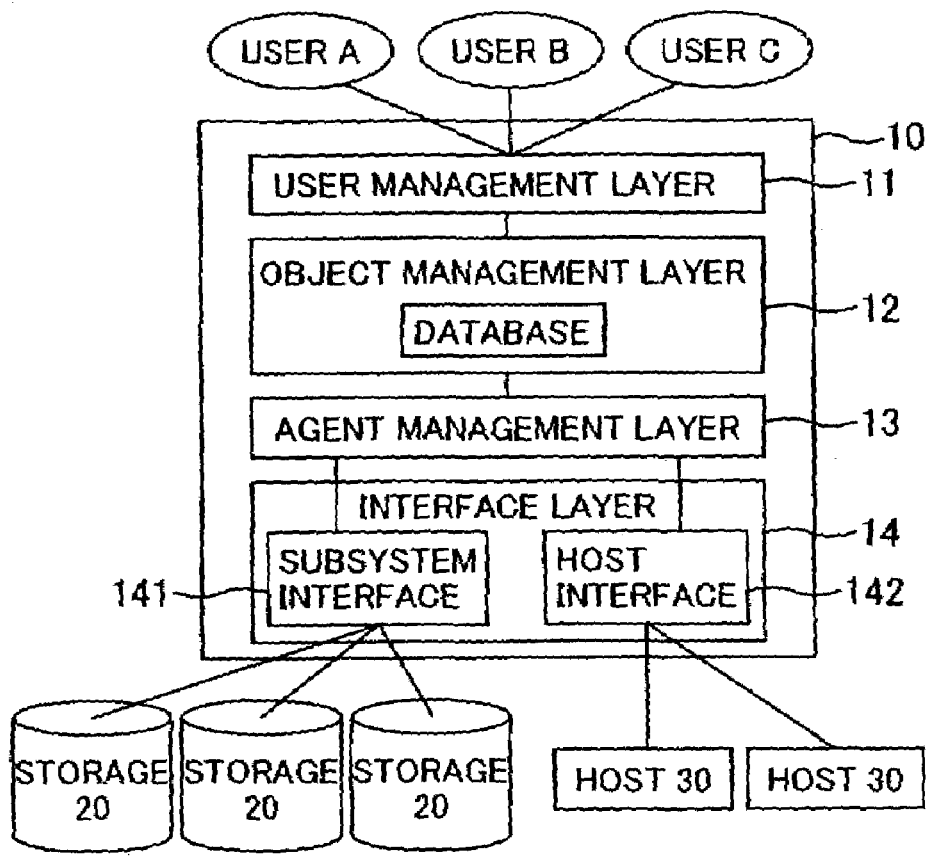
FIG. 3 shows an example of information on correspondence between virtual devices and devices according to an embodiment of the present invention.
FIG. 4 is a block diagram that shows the functions of a management server according to an embodiment of the present invention.

Each of the hosts 30 stores information on the correspondence between devices (dev) and storage areas to be used by the application programs 31 (these storage areas are hereinafter referred to as virtual devices (vdev)). A "device (dev)" is defined by a combination of a logical device (LDEV) 21 formed in a storage 20 and the access path to that logical device (LDEV) 21. For example, in the configuration shown in FIG. 2, dev1 accesses LDEV1 in storage 1 via path1 of the FC switch 1, while dev2 accesses the same LDEV1 in the storage 1 via path2 of the FC switch 1. Similarly, dev3 accesses LDEV3 in the storage 2 via path3 of the FC switch 2. FIG. 3 shows an example of the correspondence between the virtual devices (vdev) and the devices (dev). Each of the hosts 30 may store this correspondence. FIG. 3 also shows which storage 20, logical device (LDEV) 21, and logical unit (LU) are associated with each device. In the example of FIG. 3, vdev1 is associated with dev1. This means that if a host application program 31 issues an I/O to vdev1, the I/O will be sent to LDEV1 in the storage 1 via path1 of the FC switch 1.

Note that each logical device (LDEV) 21 is made up from a plurality of logical units (LUs), and the logical unit to be accessed is determined according to the path for accessing each logical device. In the example of FIG. 3, dev1, dev2, and dev3 access LU8 in LDEV1, LU10 in LDEV1, and LU5 in LDEV3, respectively.

Also note that in this embodiment, path1 is a path for accessing the FC port 1 of the storage 1 via the FC switch 1 and consists of a low speed line (1 Gbps: Not guaranteed), whereas path2 is a path for accessing the FC port 2 of the storage 1 via the FC switch 1 and consists of a low speed line (1 Gbps: Guaranteed). Further, in this embodiment, path3 is a path for accessing the FC port 3 of the storage 2 via the FC switch 2 and consists of a high speed line (2 Gbps: Guaranteed).

Each storage 20 comprises a disk controller (control section) 22 and has a management agent program 23 and a copy program 221 installed therein. Each storage 20 is controlled by a microprogram that is run on a processor (CPU) mounted on the disk controller 22. Incoming I/O from any host 30 can be detected by this microprogram, making it possible to obtain "access information." "Access information" may include information on route or frequency of access which a host makes to a logical volume. The management agent 23 stores and manages the access information as "statistical information". When the copy program 221 is notified, by the disk controller 22, of copy-source data (which is data to be copied) and a target device (to which the data is copied) in the host 30, the copy program 221 transfers the source data to the copy target.

Figure 10:
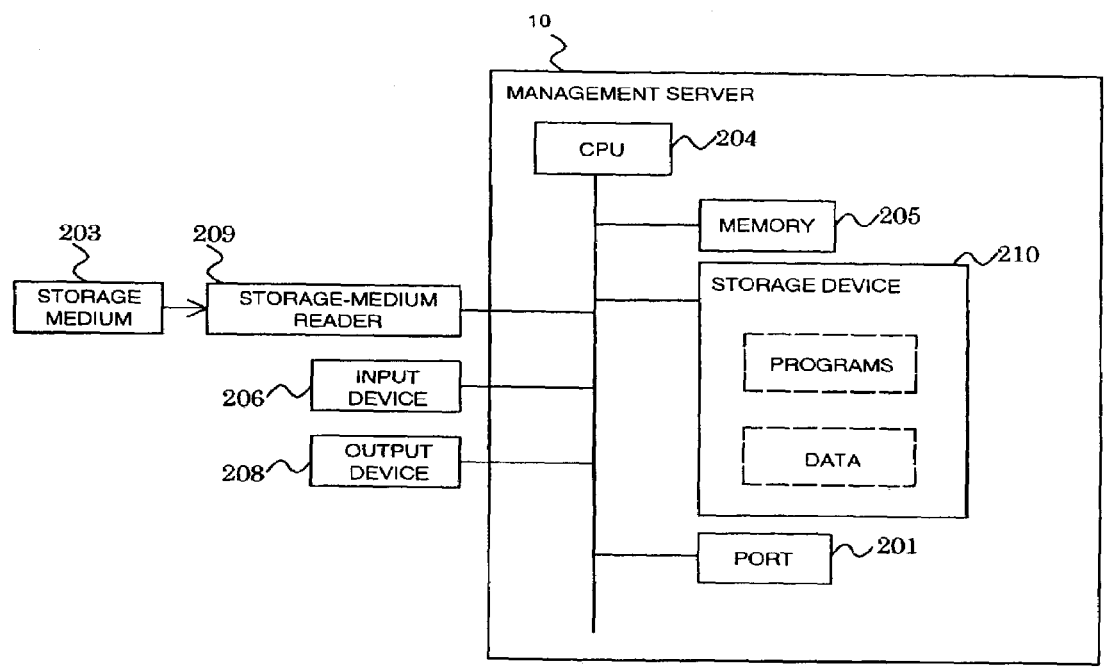
FIG. 10 is a diagram of a management server according to an embodiment of the present invention.

The management server 10 is a computer system to which a management program 101 is installed. FIG. 10 is a block diagram that shows the configuration of the management server 10. The management server 10 comprises a CPU (Central Processing Unit) 204, a memory 205, a storage device 210, a storage-medium reader 209, an input device 206, an output device 208, and a port 201.

The CPU 204 takes charge of the overall control of the management server 10 and realizes various functions according to the present embodiment by executing various programs stored in the memory 205. The storage device 210 can store various programs and data. For example, hard disk devices and the like may be used as the storage device 210. In the present example, the storage device 210 stores programs, such as the management program 101, that realize the functions shown in FIG. 4 which will be explained in detail below. Note that the storage device 210 may be build into the management server 10, or it may be mounted externally. The storage-medium reader 209 is a device for reading various programs and/or data recorded on a storage medium 203. The various programs and/or data that have been read are stored in the storage device 210. Flexible disks, CD-ROMS, semiconductor memories and the like can be used as the storage medium 203. The storage-medium reader 209 may be build into the management server 10, or it may be mounted externally. The input device 206 is used for an operator to input data to the management server 10. For example, a keyboard, a mouse or the like may be used as the input device 206. The output device 208 is used as a display device for expressing various information. For example, a display, a printer or the like may be used as the output device 208. The port 201 is used for communication with, for example, the management network 50.

FIG. 4 is a block diagram showing the functions of the management server 10. The management server 10 has a user management layer 11, an object management layer 12, an agent management layer 13, and an interface layer 14. The object management layer 12 is provided with a database that stores information about the configuration of each storage 20. The interface layer 14 is provided with a subsystem interface 141 and a host interface 142.

The management server 10 is connected to a plurality of user terminals A through C via the user management layer 11. The management server 10 is also connected to the storages 20 via the subsystem interface 141. Further, the management server 10 is connected to the hosts 30 via the host interface 142.

The user management layer 11 manages the user terminals A through C, although a system administrator may use the user terminals A through C. The object management layer 12 obtains information about each host 30 and storage 20, such as configuration, performance, failures, and errors, and other event information. The obtained information is stored in the database. More specifically, the stored information may include the following: the IP addresses and port addresses of the hosts 30 and the storages 20; the internal access paths in each storage 20; logical volumes configured in each storage 20; the capacity of each logical volume; access protection level of each logical volume; rules employed for copying or transferring data; settings for copying data between the storages 20; settings of the performance/control of each storage 20; rules employed for obtaining performance data from each storage 20; settings for maintenance of each storage 20; information on abnormal conditions (failure, etc.); and information about events that occur due to user operations. Further, system configuration-related information about the FC switches or IP routers may be stored.

In the system configured as above, the management program 101 of the management server 10 performs "optimization of data" (or, determines the optimum area for storing data) that is used by the application program 31, based on the access information (i.e., statistical information about the accesses from hosts 30) recorded in each storage 20 as described below.

<Recording Access Information>

First, the statistical information recorded in each storage 20 as to the accesses from the hosts 30 will be explained below. When the application program 31 of the host 30 issues an I/O to a virtual device (vdev), the host 30 refers to the above-mentioned correspondence between the virtual devices (vdev) and the devices (dev) and accesses the device (dev) corresponding to the virtual device (vdev) to which the I/O has been issued. In the case of FIG. 2 and FIG. 3, if an I/O is issued to vdev1 in the host 1, the I/O is sent to LU8 of LDEV1 in the storage 1 via a port (FC port X) of the host 1 and path1 of the FC switch 1. Likewise, if an I/O is issued to vdev2 in the host 1, the I/O is sent to LU10 of LDEV1 in the storage 1 via the port (FC port X) of the host 1 and path2 of the FC switch 1; if an I/O is issued to vdev2 in the host 2, the I/O is sent to LU10 of LDEV1 in the storage 1 via a port (FC port Y) of the host 2 and path2 of the FC switch 1; and if an I/O is issued to vdev3 in the host 2, the I/O is sent to LU5 of LDEV3 in the storage 2 via the port (FC port Y) of the host 2 and path3 of the FC switch 2. The route of each access can be specified by, for example, the address of the port of the host 30 (defined by a WWN), the address of the port of the storage 20, the ID (number) of the logical volume 21, and so on.

Receiving an I/O in the storage 20, the disk controller 22 detects information on the access route and the access frequency, and the management agent 23 records the detected information as statistical information for every access route. FIG. 5 shows an example of the statistical information that may be recorded in the storage 1. In this figure, statistical information is summarized as a table, and each row indicates information about one access route. In this example, the access frequency is recorded for each port of the host 30. If iSCSI is used, the access frequency may be recorded according to the IP address of each host. The first row 501 just below the title row 500 indicates accesses from the host 1 to LU8 of LDEV1 in the storage 1 via the path1 of the FC switch 1. The values indicate the product number of the storage 1, the LDEV number (1) of LDEV1, the LU number (8) of LU8, the address of the path1 port of the FC switch 1, the address of the FC port X of the host 1, and the frequency (i.e., the number of times (per week)) at which access was made through this route.

The management server 10 makes an inquiry to each storage 20 periodically, for example, once a week, to gather statistical information recorded in each of the storages 20 as mentioned above. First, the management program 101 on the management server 10 sends a request to the management agent 23 in each storage 20 via the LAN (management network) 50. Receiving this, the management agent 23 in each storage 20 sends back the statistical information recorded in its storage 20 to the management server 10. Then, the management server 10 gathers the statistical information sent back from the storages 20 and manages the statistical information in an integrated manner as shown in FIG. 6. In this figure, each row indicates statistical information about one access route, alike the statistical information recorded in each of the storages 20 as shown in FIG. 5. FIG. 6 is different from FIG. 5 in that there are plural storage product numbers.

Note that the system may also be configured in such a manner that each host 30 accesses data via the management server 10, and statistical information mentioned above is recorded in the management server 10. Further, the system may be configured in such a manner that statistical information recorded in each of the storages 20 is automatically sent to the management program 101 on the management server 10 via the LAN (management network) 50.

In addition to the above-mentioned configuration in which the statistical information is gathered in a passive manner, it is also possible to gather network route information, such as hop count and node IP address, and response time using the "traceroute" command.

<Benchmark Test>

Next, explanation will be made of the "benchmark test", i.e., how the performance of each access from each of the hosts 30 to the storages 20 is evaluated. Periodically, for example, once a day, the management server 10 measures the time taken to read/write data upon access from each host 30 to each storage 20. The performance of accesses (access performance) from a specific host 30 to a specific storage 20 is evaluated based on the measurement results. The management program 101 on the management server 10 sends, to the management client 32 in each host 30 via the LAN (management network) 50, a "benchmark test execution request" in an appropriate order. The request includes information for designating a specific logical unit in a storage 20 (e.g., port addresses of a path for accessing the relevant storage 20 and the logical unit No.). When the host 30 receives such a request, the management client 32 in the host measures the time taken to read/write a data block of a predetermined size from/to the designated logical unit. Then, the management client 32 sends the measurement result back to the management server 10. The management program 101 in the management server 10 receives and records the measurement result. What is recorded as the measurement result may include the port address of the access source host 30, the port address of the accessed storage 20, the logical unit No. of the accessed logical unit in the storage 20, the measured read time, and the measured write time. The management server 10 requests the management client 32 in each host 30 to sequentially perform such a benchmark test from the host side to the logical units in each of the storages 20. The measurement results are managed by the management server 10 in an integrated manner as shown in FIG. 7. Each row in FIG. 7 shows the result of one test. For instance, the first row 701 just below the title row 700 indicates that when LU8 of LDEV1 in the storage 1 was accessed from the host 1 port (FC port X), it took 6 seconds to read data of a predetermined size, and it took 11 seconds to write data of the same size. Likewise, the third row 703 indicates that when LU10 of LDEV1 in the storage 1 was accessed from the host 2 port (FC port Y), it took 5 seconds to read data of a predetermined size, and it took 9 seconds to write data of the same size; and the fifth row 705 indicates that when LU5 of LDEV3 in the storage 2 was accessed from the host 2 port (FC port Y), it took 2 seconds to read data of a predetermined size, and it took 4 seconds to write data of the same size.

<Determining Optimum Storage Area>

Figure 8:
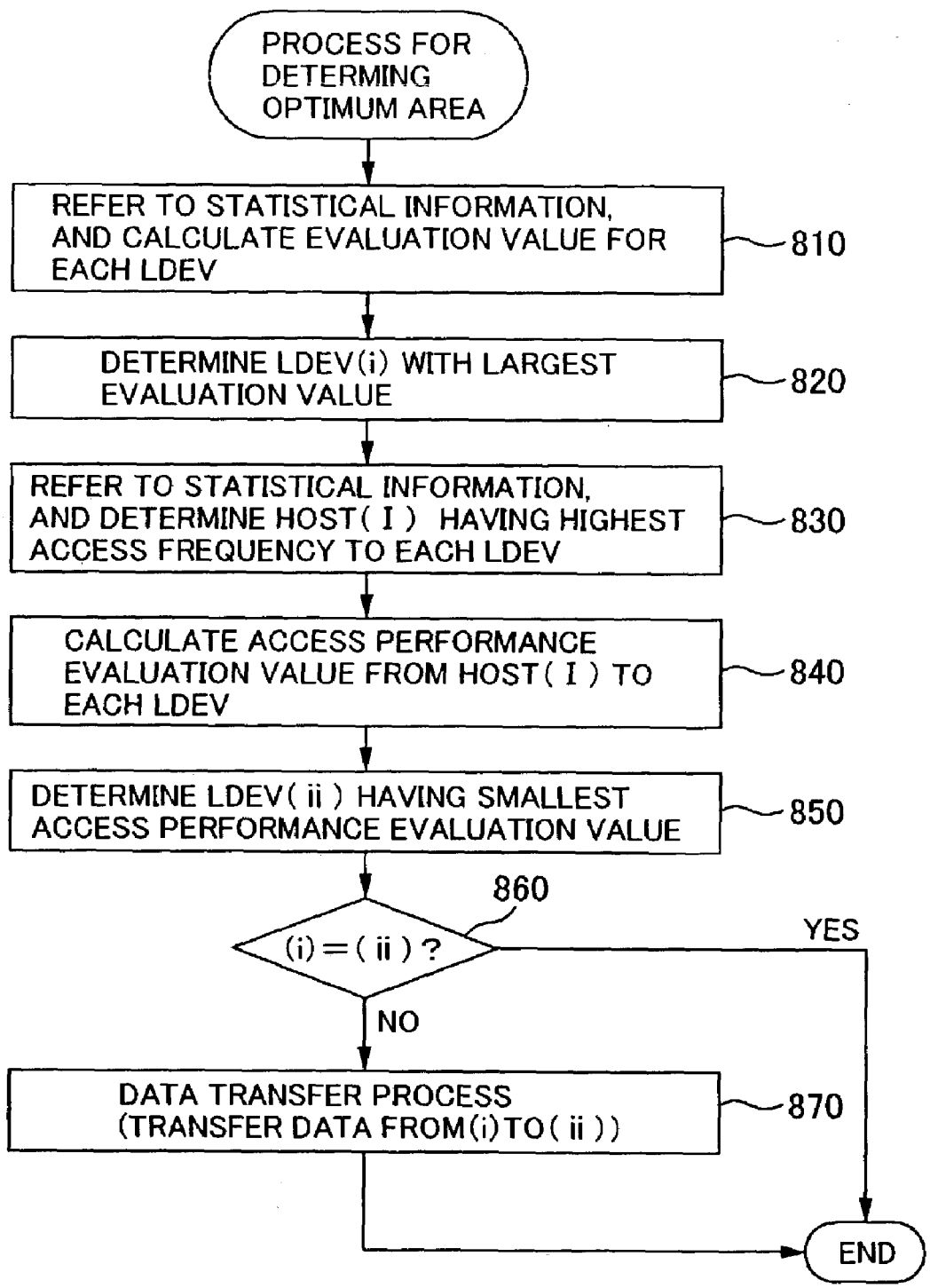
FIG. 8 is a flowchart of an optimum area determination process according to an embodiment of the present invention.

The management server 10 performs optimization of where to store the data that is used by the application program, for example, when the statistical information recorded in the respective storages 20 has been integrated by the management server 10, or when the administrator makes an operation. The procedure of data optimization will be explained in detail below with reference to the process flowchart in FIG. 8. First, the management program 101 in the management server 10 checks statistical information, such as the one shown in FIG. 6, and calculates an evaluation value for each logical device (LDEV) 21 of each storage 20 according to the evaluating procedure described below (Step 810 in FIG. 8). The evaluation value for a logical device (LDEV) 21 is obtained, for example, according to the following procedure:

(1) how many times all access routes to the LDEV 21 were totally used is obtained;

(2) a ratio between a number of times of a certain access route to the LDEV 21 being used and the total number of times of all routes being used is obtained;

(3) the obtained ratio is multiplied by the number of times of the access route to the LDEV 21 being used;

(4) processes (2) and (3) are repeated for each access route; and (5) the largest product obtained in process (4) is determined to be the evaluation value for that LDEV 21.

In another example, the evaluation value for an LDEV 21 can be obtained by the following equation:

Evaluation value for an *LDEV* 21=[(the number of times of accesses (access frequency) for the most frequently used access route)/(the total number of times all access routes to the *LDEV* 21 were used)]×(the number of times of accesses (access frequency) for the most frequently used access route)

For example, in the case of the statistical information shown in FIG. 6, the evaluation value of LDEV1 is calculated as below. First, the table in FIG. 6 shows that, among the access routes to LDEV1, the most frequently used access route is the route shown in the third row 603 where LU10 in the storage 1 is accessed from the host 2 port (FC port Y) via path2 of the FC switch 1. The table in FIG. 6 shows that this route was used 3000 times a week, and this access frequency accounts for two thirds of the total number of times LDEV1 was accessed (4500 times a week=(1000 times to LU8 in the storage 1 from the host 1 port (FC port X) via path1 of the FC switch 1 as shown in the first row 601)+(500 times to LU10 in the storage 1 from the host 1 port (FC port X) via path2 of the FC switch 1 as shown in the second row 602)+(3000 times through the route shown in the third row 603)). Therefore, the evaluation value of LDEV1 is 2000 (=3000×2/3). The evaluation value of LDEV3 is also calculated in the same manner. FIG. 6 indicates that LU5 in the storage 2 was accessed 10 times a week from the host 1 port (FC port X) via path3 of the FC switch 2 as shown in the fourth row 604, and LU5 in the storage 2 was accessed 90 times a week also from the host 2 port (FC port Y) via path3 of the FC switch 2 as shown in the fifth row 605. Thus, the evaluation value of LDEV3 is calculated by multiplying 90 by 90/100, resulting in 81. Then, the logical device 21 that has the highest evaluation value is determined according to the evaluation values calculated for each of the logical devices 21 (Step 820). In the case of FIG. 6, LDEV1 is determined to be the logical device 21 having the highest evaluation value.

In addition, when the management program 101 on the management server 10 refers to the statistical information, it also determines from which host 30 each logical device 21 was accessed most frequently (Step 830). That is, by checking the statistical information about the access routes to a logical device 21 of concern, the management program 101 sums up the number of accesses via each host port address and compares the obtained numbers to determine (detect) which host 30 accessed the logical device 21 most frequently. In the case of FIG. 6, the host 1 accessed LDEV1 1500 times in total, since LDEV1 was accessed from the host 1 port (FC port X) 1000 times via path1 as shown in the first row 601 and 500 times via path 2 as shown in the second row 602. LDEV1 was also accessed from the host 2 port (FC port Y) 3000 times in total as shown in the third row 603. Thus, it is determined that the host 2 accessed LDEV1 most frequently. Likewise, since LDEV3 was accessed 10 times from the host 1 as shown in the fourth row 604 and 90 times from the host 2 as shown in the fifth row 605, it is determined that the host 2 accessed LDEV3 most frequently. The data accessed by such a host 30 will be transferred to a storage area having a higher access performance according to a procedure described later.

Then, based on the results of the benchmark test as mentioned above, the management program 101 calculates a value for evaluating the performance of access to a logical device 21 from the host 30 specified to have accessed the logical device 21 most frequently (hereinafter, this value will be denoted as "access performance evaluation value") (Step 840). The method for calculating this value is described below. First, priorities are assigned to read and write accesses to the logical device 21 by, for example, an operational input to the management server 10 by the administrator. Specifically, the priorities can be assigned in a manner so that a coefficient A for read access and a coefficient B for write access meet the equation A+B=1.

Then, the management program 101 refers to the benchmark test results as shown in FIG. 7, and, for each of the access routes, picks up the read time and write time taken to access the logical device 21 from the host 30 specified to have accessed the logical device 21 most frequently. Then, the management program 101 multiplies the read time and write time by A and B, respectively, and sums up the products. This sum is regarded as the access performance evaluation value to the logical unit of the logical device 21 from the specific host 30. If there is a plurality of access routes from the host 30 to the logical device 21, the smallest value is taken as the access performance evaluation value to the logical device from the host. With reference to the examples shown in FIGS. 6 and 7, the method for calculating the access performance evaluation value will be explained more specifically. If both read and write coefficients A and B are set to 0.5 (i.e., read and write are given the same priority), the access performance evaluation value of the access route from the host 2 to LU10 of LDEV1 is calculated by adding up the read time (5 sec.) multiplied by the coefficient A (0.5) and the write time (9 sec.) multiplied by the coefficient B (0.5), that is, 5×0.5+9×0.5=7. Likewise, the access performance evaluation value of the access route from the host 2 to LU5 of LDEV3 is calculated by adding up the read time (2 sec.) multiplied by the coefficient A (0.5)

and the write time (4 sec.) multiplied by the coefficient B (0.5), that is, 2×0.5+4×0.5=3. Then, the management program 101 determines which storage area (logical unit in the logical device 21) shows the smallest access performance evaluation value (Step 850). This storage area is considered the best in access performance for the specific host 30. In the case of FIGS. 6 and 7, LU5 of LDEV3 is considered as the storage area having the highest access performance for the host 2. According to a procedure described later, the data accessed by the specific host 30 will be transferred to the storage area determined in this step (Step 870). In the case of FIGS. 6 and 7, it can be said that the data used by the application program 12 on the host 2 will be transferred from LDEV1 to LDEV3.

Note that if data of the host 30, specified to be a candidate for transfer, is currently stored in a storage area having the smallest access performance value calculated for the specific host (Step 860), then there will be no need to transfer the data. If the storage area currently storing data for the host 30, which has been specified to be a candidate for transfer, and the storage area having the smallest access performance evaluation value calculated for the host are determined to be the same logical device 21, the path for accessing that storage area may instead be redefined.

In this embodiment, the storage area with the highest access performance is determined and selected as a new location for storing data, based on the results of the benchmark test. However, a storage area in a storage 20 that has the shortest route to the host 30 or that has the largest free capacity can be determined to be the "storage area with the highest access performance", and this storage area can be determined as the new location for storing data.

Further, in this embodiment, data accessed by the host 30 with the relatively highest frequency is selected as data to be removed. However, the data in a storage area in a storage 20 that has the longest route from the host 30, the data in a storage area in a storage 20 that has the smallest free capacity, or the data in a storage area whose access performance from the host 30 is found low according to the results of the benchmark test can be determined to be the "data to be transferred".

<Data Transfer Processing>

Figure 9:
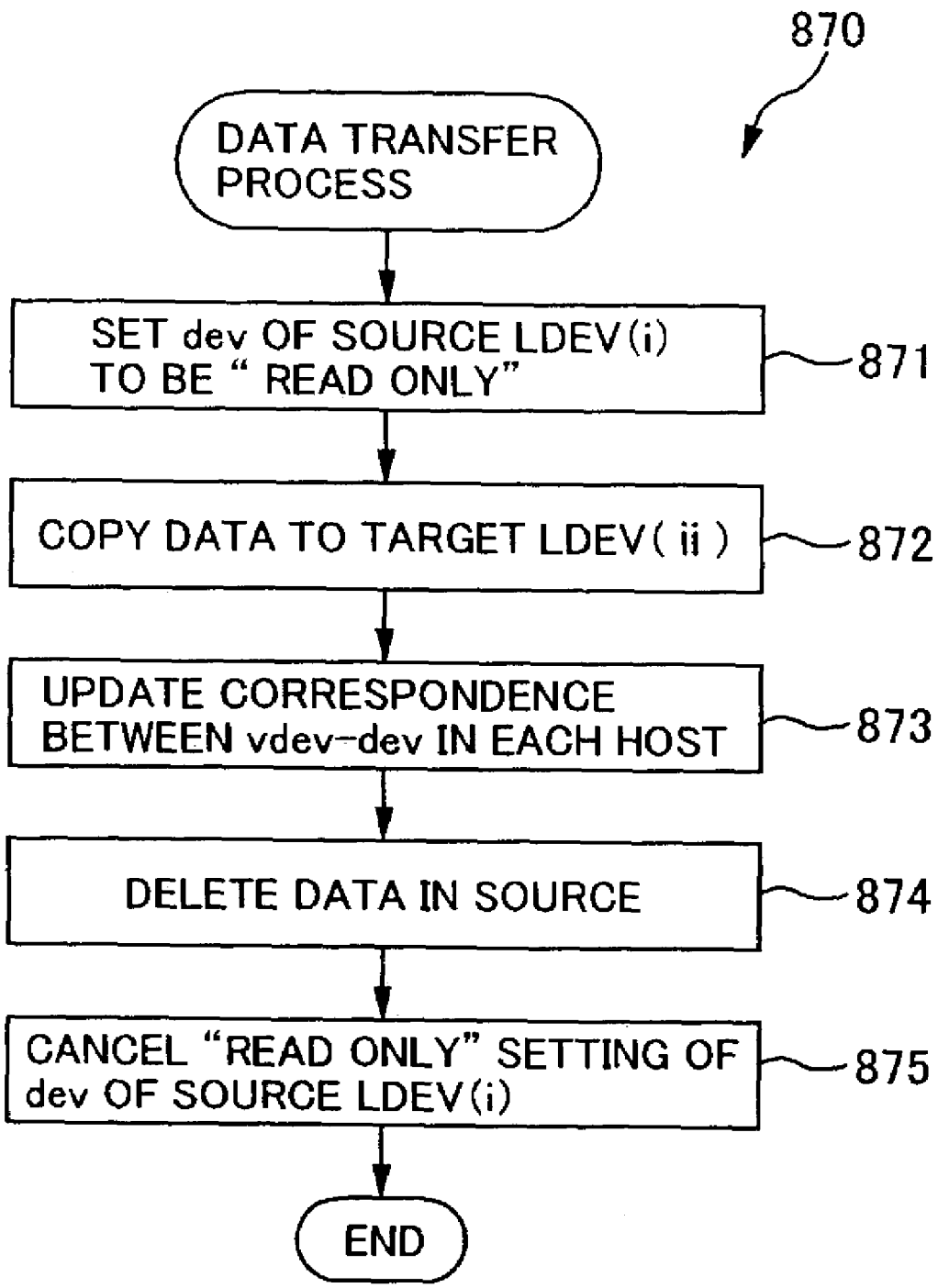
FIG. 9 is a flowchart of a data transfer process according to an embodiment of the present invention.

When data to be removed (data to be transferred) is determined as described above, the data is transferred according to a procedure as described below. FIG. 9 is a process flowchart showing the data transfer processing. First, the management program 101 on the management server 10 notifies the management client 32 on each host 30 of the data transfer. Receiving the notification, each management client 32 sets "read only" to the device (dev) corresponding to the logical device containing the data to be transferred (Step 871). In the case of FIGS. 6 and 7, if data is to be transferred from LDEV1 to LDEV3, "read only" is set to the devices dev1 and dev2 that correspond to the LDEV1.

In addition, the management program 101 on the management server 10 notifies the management agent 23 in the storage 20 from which data is transferred of which logical device 21 contains the data to be transferred (such a logical device is hereinafter called "source logical device" or simply "source") and which logical device 21 the data is to be transferred to (such a logical device is hereinafter called "target logical device" or simply "target"). Receiving the notification, the management agent 23 passes the notification to the copy program 221 in the disk controller 22. Then, the copy program 221 copies (transfers) the data from the source logical device 21 to the target logical device 21 via the SAN 40 (Step 872). For example, in the case of FIGS. 6 and 7, data in LDEV1 is copied to LDEV3. This processing may be modified so as to perform a data swap by also copying data from LDEV3 (associated with dev3) to LDEV1.

Then, the management client 32 on each host 30 updates the recorded correspondence between the virtual devices (vdev) and the devices (dev) so as to reflect the data transfer (Step 873). In the case of FIGS. 6 and 7, the correspondence recorded in the host 2 is updated so that vdev1 is associated with dev3 and vdev2 is also associated with dev3. If data is swapped between the source and the target by transferring data from LDEV3 to LDEV1 as well as LDEV1 to LDEV3, the correspondence is updated so that vdev3 is associated with dev1 and dev2. In this case, I/O to vdev3 is equally distributed to the two paths associated with dev1 and dev2.

Then, the data in the source is deleted (Step 874). Further, the "read only" setting (set in Step 871) is cancelled from the device (dev) associated with the source logical device (Step 875). Then, the process is ended.

Note that the data transfer processing may also be ended without deleting the data from the source device.

After that, according to instructions by the management program 101 on the management server 10, the statistical information (as shown in FIG. 5) managed by each storage 20 and the results of the benchmark test among each host 30 and each storage 20 (as shown in FIG. 7) managed by the management server 10 are initialized. Then, the processing for data optimization (Steps 810 through 875) will be repeated based on subsequent recording of access information.

<Others>

Note that although FIG. 2 shows only one management server 10, the system may comprise a plurality of management servers 10. The management server 10 may be built in the storage 20. Further, the functions of the management server 10 may be implemented as an internal management server section of a storage 20. That is, the term "management server" encompasses what is meant by the term "management server section". On the other hand, the management server 20 may be provided at a physically remote place from the storage 20.

While the present invention has been described in terms of its preferred embodiment, it should be understood that the invention is not limited to the preferred embodiment, and that variations may be made without departure from the scope and spirit of the invention.

According to the preferred embodiment, the following effects can be achieved.

Data used by each host is transferred by the management server to a storage area having high access efficiency, based on access information obtained from each host. This provides improved access efficiency among the whole system.

Access efficiency can be determined by the management server based on access frequency. This results in distribution of access frequency throughout the whole system, realizing load distribution among the storage devices and hosts in the system.

Access efficiency can be determined by the management server based on the time taken for the access. This results in distribution of access frequency throughout the whole system, realizing load distribution among the storage devices and hosts in the system.

Access efficiency can be determined by the management server based on the free capacity of the storage device. This makes it possible to effectively use the storage areas of storage devices throughout the whole system.

Access efficiency can be determined by the management server based on the length of the access route. By making access routes uniform in length, it becomes possible to provide improved access efficiency throughout the whole system.

The management server can measure access performance from the host to the storage area and determine access efficiency based on the measured access performance. This results in providing improved access efficiency throughout the whole system since it becomes possible to flexibly cope with the situation changing with time.

Data used by each host can be transferred to storage areas having higher access efficiency.

What is claimed is:

1. A method for processing information with an information processing device for managing a plurality of storage devices connected to at least one host computer via a network, said method comprising steps of:
    referring to access information obtained from said at least one host computer, said access information indicative of time to process I/O requests as measured by said at least one host computer for each of said storage devices;
    determining a first performance measure based on said access information;
    determining a first storage area in said storage devices having the first performance measure;
    determining a first host computer from among a plurality of host computers that access said first storage area, said first computer having a measure of performance that is lower than others of said host computers as determined based on said access information;
    determining a second storage area in said storage devices that is accessed by said first host computer, said second storage area having a second performance measure greater than said first performance measure; and
    transferring data that is stored in said first storage area to said second storage area.

2. A method for processing information according to claim 1, wherein
    said access information includes at least access frequency, and
    said access efficiency is determined based on said access frequency.

3. A method for processing information according to claim 1, wherein
    said access information includes at least access time taken for access, and
    said access efficiency is determined based on said access time.

4. A method for processing information according to claim 1, wherein
    said access information includes at least information on free capacity of said storage device, and
    said access efficiency is determined based on said information on free capacity.

5. A method for processing information according to claim 1, wherein
    said access information includes at least information about access routes, and
    said access efficiency is determined based on the lengths of said access routes.

6. A method for processing information according to claim 1, wherein
    performance of accesses from said host computer to each of said storage areas in said storage device is measured, and
    said access efficiency is determined based on a result of said measurement.

7. A method for processing information according to claim 1, wherein said information processing device executes a step of recording said access information.

8. A method for processing information according to claim 1, further comprising:
    deleting said data stored in said first storage area after transferring data from said first storage area to said second storage area.

9. A method for processing information with a controller of at least one of a plurality of storage devices connected to a plurality of host computers via a network, said method comprising steps of:
    referring to access information contained in said host computers that is representative of frequency of I/O requests made between each of said host computers and each of said storage devices;
    determining a first performance measure based on said access information;
    determining a first storage area of said storage devices having the first performance measure, which indicates low access efficiency;
    determining a host computer from among plural host computers which access said first storage area, said host computer having lower access efficiency in terms of access to said first storage area relative to others of said host computers as determined based on said access information;
    determining a second storage area in said storage devices that is accessed by said host computer and has a measure of performance that is higher than said first performance measure; and
    transferring data that is stored in said first storage area used by said host computer to said second storage area.

10. A method for processing information according to claim 9, further comprising:
    deleting said data stored in said first storage area after transferring data from said first storage area to said second storage area.

11. An information processing device for managing a plurality of storage devices connected to at least one host computer via a network, said information processing device comprising:
    means for referring to access information obtained from said at least one host computer, said access information either being indicative of time to process I/O requests as measured by said at least one host computer for each of said storage devices or being representative of frequency of I/O requests made between said at least one host computer to each of said storage devices;
    means for determining a first performance measure based on said access information;
    means for determining a first storage area in said storage devices having the first performance measure;
    means for determining a host computer from among plural host computers which can access said first storage area, said host computer having lower access efficiency relative to the other host computers as determined based on said access information;
    means for determining a second storage area in said storage devices having a higher measure of performance than said first performance measure, said second storage area being accessed by said host computer; and means for transferring data that is stored in said first storage area having low access efficiency and used by said host computer having low access efficiency to said second storage area.

12. An information processing device according to claim 11, wherein
said access information includes at least access frequency, and
said access efficiency is determined based on said access frequency.

13. An information processing device according to claim 11, wherein
said access information includes at least access time taken for access, and
said access efficiency is determined based on said access time.

14. An information processing device according to claim 11, wherein
said access information includes at least information on free capacity of said storage device, and
said access efficiency is determined based on said information on free capacity.

15. An information processing device to claim 11, wherein
said access information includes at least information about access routes, and
said access efficiency is determined based on the lengths of said access routes.

16. An information processing device according to claim 11, wherein
performance of accesses from said host computer to each of said storage areas in said storage device is measured, and
said access efficiency is determined based on a result of said measurement.

17. An information processing device according to claim 11, further comprising means for recording said access information.

18. A storage device managed by the information processing device according to claim 11, said storage device comprising:
means for recording access information about accesses from said host computer;
means for making said information processing device refer to said access information; and
means for transferring designated data to a designated storage area.

19. A method for processing information according to claim 11, further comprising:
an erasing module configured to delete said data stored in first storage area after transferring data from said first storage area to said second storage area.

20. A storage medium having a program, said program executing on an information processing device for managing a plurality of storage devices connected to at least one host computer via a network, said information processing device performing steps of:
referring to access information obtained from said at least one host computer, said access information either being indicative of time to process I/O requests as measured by said at least one host computer for each of said storage devices or being representative of frequency of I/O requests made between from said at least one host computer to each of said storage devices;
determining a first storage area in said storage devices that has low access efficiency as determined based on said access information;
determining a host computer having low access efficiency in view of said first storage area as determined based on said access information;
determining a second storage area in said storage devices having high access efficiency at least from said host computer; and
transferring data that is stored in said first storage area having low access efficiency and used by said host computer to said second storage area having high access efficiency.

21. A storage medium having a program recorded thereon according to claim 20, wherein
said access information includes at least access frequency, and
said access efficiency is determined based on said access frequency.

* * * * *